Dec. 30, 1952   J. FRÜH   2,623,342
POTATO DIGGER
Filed Aug. 7, 1947   3 Sheets-Sheet 1

Inventor
J. Früh

Dec. 30, 1952 J. FRÜH 2,623,342
POTATO DIGGER
Filed Aug. 7, 1947 3 Sheets-Sheet 2

Inventor
J. Früh
By Glascock Downing Seebold
Attys

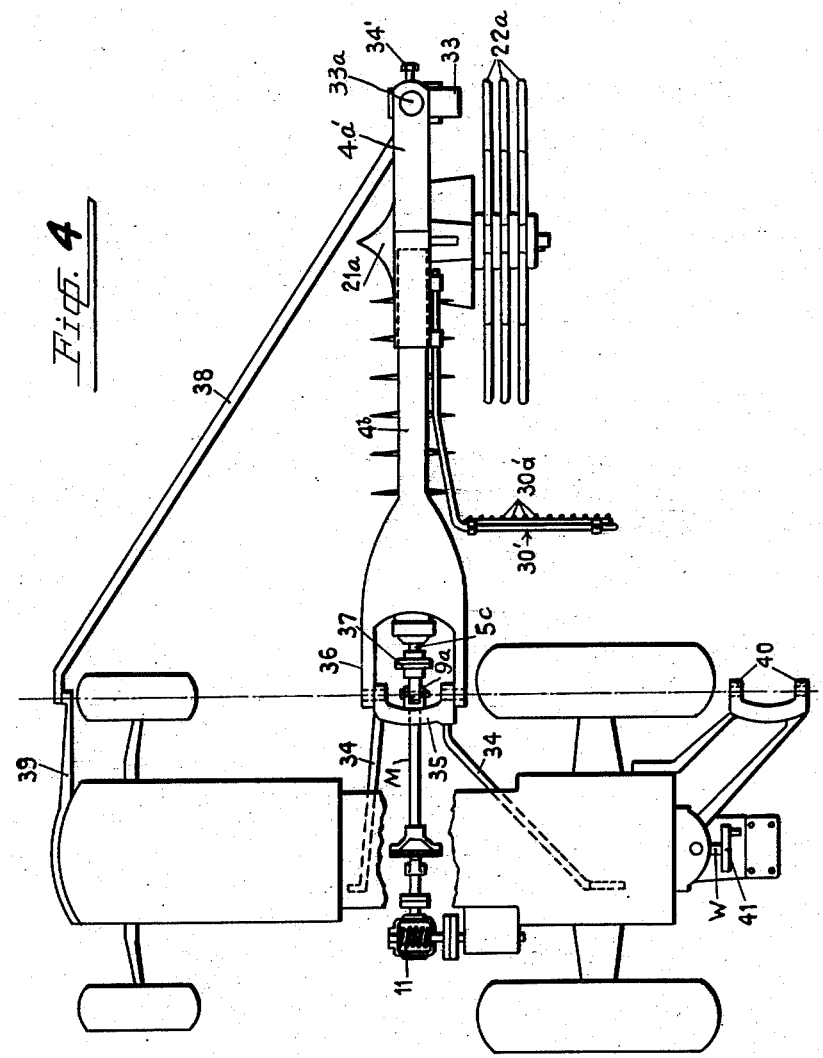

Patented Dec. 30, 1952

2,623,342

UNITED STATES PATENT OFFICE 2,623,342

POTATO DIGGER

Jakob Früh, Degersheim, Switzerland

Application August 7, 1947, Serial No. 767,128
In Switzerland October 9, 1945

Section 1, Public Law 690, August 8, 1946
Patent expires October 9, 1965

3 Claims. (Cl. 55—139)

The present invention relates to an agricultural implement arranged on a tractor and driven by the power take-off mechanism embodied with the tractor.

More particularly the invention relates to an agricultural implement including a shaft driven by the power take-off shaft of the tractor and said implement embodying means permitting vertical adjustment of this shaft with respect to the ground over which the tractor and the attached implement passes.

Specifically the present invention has for an object to provide an agricultural implement as an attachment for a tractor, including a power shaft adapted for connection with the power take-off shaft of a tractor and means permitting vertical movement of this shaft with relation to the ground combined with means for harvesting potatoes or similar earth growing crops.

Other objects and advantages will be apparent from the following description taken in connection with the accompanying drawing, in which:

Figure 4 is a somewhat diagrammatic plan view of a modification of the arrangement shown in Figure 3.

Figure 1:
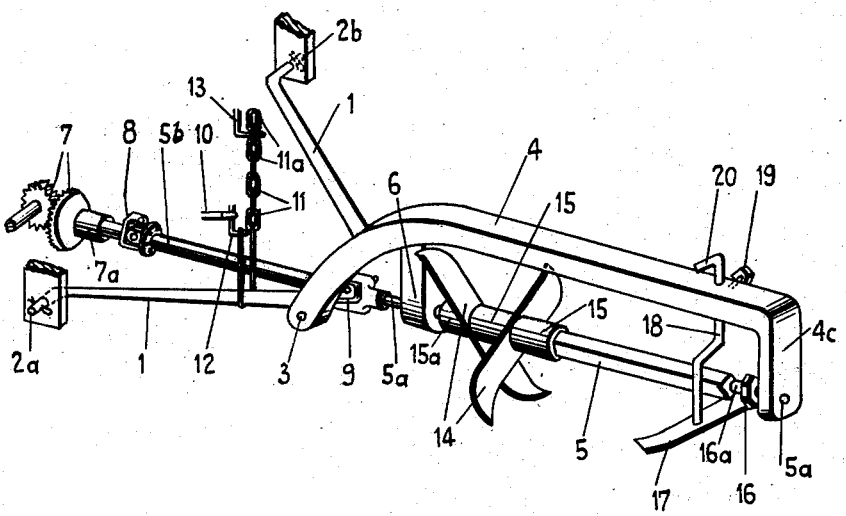
Figure 1 is a somewhat diagrammatic view with parts removed of an agricultural implement arrangement in accordance with the invention disclosing an implement shaft carrying ground working blades.

Referring particularly to the drawings, the reference numeral 1 in Figure 1 designates the legs of a V-shaped support frame that are pivotally attached to the tractor at 2a, 2b so that these legs are capable of swinging through a suitable angle upward and downward. At the apex of the frame the legs are fastened to a yoke 1a at points 1b, 1c. Lugs on this yoke support forked ends 4a and 4b of a suitably bent beam 4 which constitutes a main frame for the agricultural implement. Pins 3 passing through bores in the lugs on the yoke serve as pivots for the beam 4 at the forked end thereof. The other end of the beam 4 is bent downwards at an angle of approximately 90° as shown at 4c. This downwardly bent end 4c constitutes a support for journalling the end 5a of a shaft 5. The beam 4 also includes a second depending portion 6 adjacent the forked end and which dependent portion 6 is suitably apertured so as to provide another journalling support for the shaft 5a.

Figure 2:
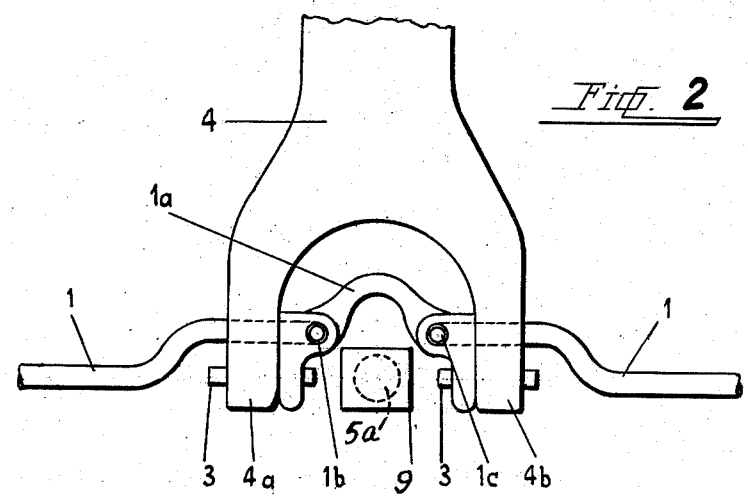
Figure 2 is a portion of the frame of the implement shown in Figure 1.

A universal joint, indicated at 9, is connected between the shaft 5a and an intermediate shaft 5b. In Figure 2 the universal joint 9 is indicated diagrammatically. Another universal joint, indicated diagrammatically at 8, is connected between the intermediate shaft 5b and the take-off drive 7 of the tractor. The arrangement is such that the universal joint 8 is located at the intersection of a line passing through the pivotal points 2a and 2b with the center line of the shaft 5b. The universal joint 9 is located at the intersection of a line passing through the axis of the pins 3 with the plane passing through the center of the beam 4. The V-shaped support frame and the intermediate shaft 5b are capable of being lifted or lowered from a portion adjacent the tractor by engagement of the chain 11 with one of the legs 1 of the V-shaped support frame. This adjustment can be varied since the effective length of the chain is made variable by selectively hooking various links 11a of the chain to spaced hooks 12 and 13 mounted on the tractor frame.

On the shaft 5 a number of ground working plates 14 are rigidly mounted. In order that the blades are secured for rotation with shaft 5, this shaft is of square cross-section between the depending journalling supports 4c and 6 and squared apertures are provided in the blades 14. This arrangement permits the blades to slide along the square section of the shaft so as to dispose them in spaced relationship to one another. The blades are held in longitudinal spaced relationship relative to shaft 5 by means of spacers 15 likewise mounted on the shaft 5. A nut 16 is provided on a threaded portion 16a at the end of shaft 5 adjacent depending support 4c. This nut engages the end spacer 15 (not shown) to clamp the blades between the several spacers. In this connection the spacer denoted at 15a adjacent depending journalling portion 6 is rigidly fastened to the shaft portion 5a.

The blades 14 are curved out of the body line at each end in opposite directions so that the two ends thereof dig through different areas along the ground.

Near the outer end of the beam 4 and inwardly of the depending portion 4c, a support 18 is mounted in a suitable bore provided in the top of beam 4. This support 18 is rigidly connected at its lower end to a slide plate 17 which supports the beam and thereby the implement relative to the ground and in sliding relationship therewith. For the purpose of adjusting the height of the beam relative to the ground, the support is slidably mounted in the aperture in the beam and secured in adjusted position by means of a set screw 19. The upper end of support 18 is bent at an angle to the shank so as to prevent the support passing through the bore of the beam 4.

Figure 3:
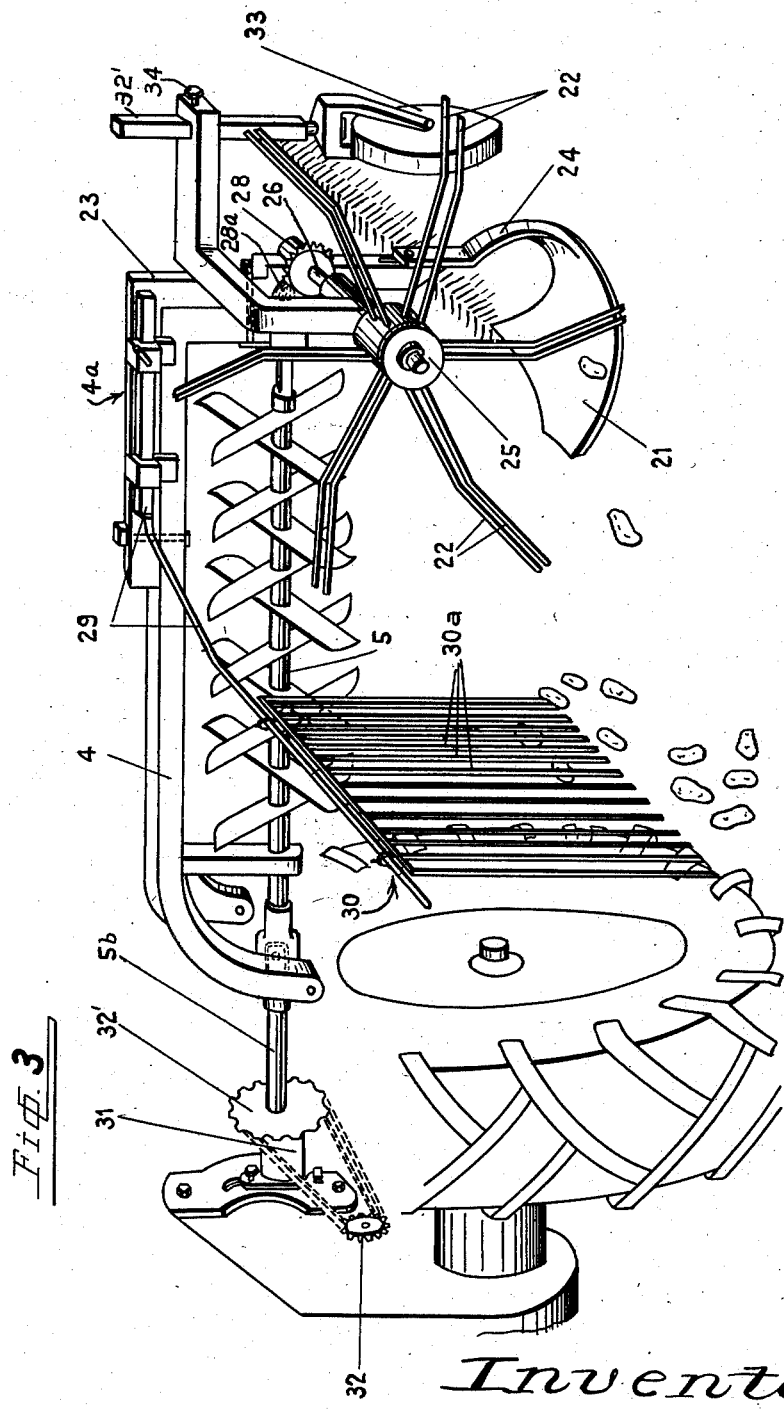
Figure 3 is a somewhat diagrammatic view of an embodiment of the present invention illustrating the attachment as a potato harvester.

With respect to the arrangement shown in Figure 3, the beam 4 is utilized for supporting a potato harvesting mechanism. In this arrangement, intermediate shaft 5b is journalled in a hub 31 adjustably mounted on the tractor frame and driven by chain drive, including sprockets 32, 32', sprocket 32 being driven by the power take-off mechanism of the tractor. The potato harvesting mechanism consists generally of a plow share 21 and a rotary digging mechanism denoted generally at 22. The plow share 21 includes an arm 24 mounted at the lower end of one arm 23 of a supplementary frame 4a that is in turn secured to main frame or beam 4. Since the axis of the beam 4 is perpendicular to the longitudinal axis of the tractor, potatoes or other earth growing crops will be displaced out of the ground by the plow share as the tractor moves along the ground.

Rearwardly of the plow share 21 is provided the rotatable digging mechanism 22. This mechanism consists of a plurality of radial arms extending outwardly of a hub 25. The plane of rotation of these arms is transverse to the direction of movement of the tractor as shown. The hub 25 is mounted on a shaft 26 rotatably supported on the arm 23a of supplementary frame 4a. Shaft 26 is provided with a bevel gear 28 meshing with a bevel gear 28a on the end section 5a of the shaft 5 so that the rotation of shaft 5 imparts drive to the shaft 26 and thereby rotates the digging mechanism.

The digging mechanism, as clearly illustrated in Figure 3, consists of rods arranged in pairs and constituting forks with the inner ends firmly attached to hub 25 and the outer ends having a bent portion extending at an angle away from the direction of rotation of shaft 26.

Between the rotating digging mechanism and the tractor is arranged a grating 30. This grating extends parallel to the longitudinal axis of the tractor and is carried by a support rod 29 with the bent portion extending parallel with the shaft 26. The grating 30 includes a plurality of depending resilient steel rods 30a fastened at their upper ends on the outwardly bent portion of the support rod 29. The support rod 29 is adjustable along the longitudinal axis of the supplementary frame 4a and the arm 23a of supplementary frame 4a includes a portion extending in alignment with the plane of the axis of the main frame or beam 4 and which portion is provided with a vertical bore through which extends the arm 32' on the lower end of which is provided a ground engaging wheel 33. By means of a set screw 34, the height of the combined main and supplementary frames 4 and 4a may be adjusted relative to the ground.

The potato harvesting implement operates as follows:

With the main frame or beam 4, including the supplementary frame 4a, and the plow share 21 set in working position, the movement of the tractor along the ground will result in the digging of furrows and the excavation of potatoes. Simultaneously the drive from the power take-off of the tractor rotates shaft 5 and through the bevel gearing shaft 26 so that the rotary digging mechanism 22 rotates in a plane transverse to the furrow with the result that the rods of the digging mechanism hurls excavated potatoes toward and against the grating 30. The potatoes contact the grating 30 and rebound therefrom and fall into a row on the ground extending in substantial parallelism with the line of movement of the tractor.

With reference to Figure 4, the general arrangement here illustrated includes a main frame or beam 4b suitably supporting a shaft that is driven by the power take-off mechanism referred to hereinafter. This beam or frame 4b includes a V-shaped supporting frame including legs 34 and a yoke 35. The yoke engages the forked ends 36 of the beam 4b in pivotal relationship and the outer ends of the legs 34 are suitably pivotally connected with the tractor frame. These connections permit vertical movement of the beam 4b, in conjunction with adjustment of a vertical arm 33a supporting a roller at the outer end of supplementary frame 4a'. At the lower end of this arm 33a is mounted a wheel 33 and the arm 33a is secured in adjusted position by the set screw 34'.

A potato harvesting mechanism is associated with the frame or beam 4a and includes the plow share 21a and the rotating digging mechanism 22a operatively connected for rotation by the shaft, including the portion 5c supported by the beam 4b in a manner similar to the arrangement shown in Figure 3. A grating, denoted generally at 30', including the depending rods 30'a, is mounted on the supplementary frame 4a' in a manner similar to the arrangement of Figure 3. In the modification of Figure 4 the power take-off includes the drive mechanism 11 driving the shaft M and through the suitable coupling 9a is connected by a coupling 37 with the shaft portion 5c.

At the forward end of the tractor is provided a rigid and laterally extending arm 39 to which a stabilizing brace rod 38 is connected at one end while at its other end this brace rod is connected to the frame portion 4a'.

In addition to the V-type support frame including the legs 34—34, there is provided an additional support frame including the yoke 40 at the rear end of the tractor. This yoke is disposed in a position adjacent the coupling member 41 driven by a power take-off shaft W so that the position of the main frame 4b can be varied with respect to its location on the tractor. In otherwords with the mechanism just described the main frame 4b can be displaced rearwardly and have its forked end 36 pivotally connected to the yoke 40 and in which event the stabilizing brace rod 38 will be disconnected from arm 39 and connected to the yoke 35.

The operation of the arrangement in Figure 4 in harvesting potatoes is the same as the operation of the arrangement shown in Figure 3.

Having now described my invention, what is claimed as new and useful and desired to be secured by Letters Patent of the United States is:

1. In a potato digger for use on tractors having a horizontal power take-off shaft, a V-shaped frame adapted to be pivotally connected to the tractor frame with the ends of its legs in horizontal alignment with the power take-off shaft, a beam having an outer downturned end and a bearing thereon spaced apart from the downturned end, an implement shaft rotatably mounted in said downturned end and in the bearing on the beam, digger blades carried by said implement shaft, said beam having an inner curved end formed as a yoke and pivotally connected to the apex of the V-shaped frame, an intermediate shaft from the power take-off shaft of the tractor to the implement shaft, a first universal joint connecting the intermediate shaft to the power take-off shaft of the tractor and positioned in alignment with the pivotal connections of the V-shaped frame to the tractor frame, and a second universal joint connecting the intermediate shaft to the implement shaft and positioned in alignment with the pivotal connection of the V-shaped frame and the yoke of the beam.

2. In a potato digger for use on tractors having a horizontal power take-off shaft, a V-shaped frame adapted to be pivotally connected to the tractor frame with the ends of its legs in horizontal alignment with the power take-off shaft, a flexible elevating member extending under one arm of the V-shaped frame and having one end connected to the tractor frame and the other end adjustably connected thereto, a beam having an outer downturned end and a bearing thereon spaced apart from the downturned end, an implement shaft rotatably mounted in said downturned end and in the bearing on the beam, digger blades carried by said implement shaft, said beam having an inner curved end formed as a yoke and pivotally connected to the apex of the V-shaped frame, an intermediate shaft from the power take-off shaft of the tractor to the implement shaft, a first universal joint connecting the intermediate shaft to the power take-off shaft of the tractor and in alignment with the pivotal connection of the V-shaped frame to the tractor frame, a second universal joint connecting the intermediate shaft to the implement shaft and positioned in alignment with the pivotal connection of the V-shaped frame and the yoke of the beam, a support connected to the outer end of said beam, a wheel, and a vertical standard rotatably mounting said wheel and adjustably connected to said support for mounting the beam.

3. A potato digger for attachment to a tractor having a power take-off comprising a frame including a main portion including an inner end and an outer supplementary portion forming a continuation of the main portion, supporting means connecting the inner end of the frame to a tractor, including means mounting the frame for swinging movement with respect to the tractor, said supporting means supporting the frame so as to extend transversely of the line of travel of the tractor, longitudinally spaced depending supports extending from said frame, shaft means journalled in said supports, means for coupling the shaft means to the power take-off of the tractor including a coupling permitting at least vertical swinging movement so that when the frame swings the drive to the shaft is uninterrupted, a shaft rotatably supported by the outer supplementary portion of the frame, said shaft extending perpendicular to the axis of said shaft means, gearing connecting the shaft means and the shaft so that drive is transmitted from the power take-off of the tractor to said shaft, a plow share carried by the supplementary portion of the frame beneath said shaft, said shaft being above said plow share and further extending rearwardly thereof with relation to the direction of movement to be imparted to the frame by the tractor, a rotatable digging and hurling means carried by said shaft rearwardly of said plow share and rotatable in a plane transverse to the line of travel, a grating carried by the frame between the digging and hurling means and the supporting means, said grating including a depending portion extending transverse to the plane of rotation of said digging and hurling means so as to receive and deposit on the ground the potatoes furrowed from the ground by said plow share and hurled from the furrow by said digging and hurling means, and ground engaging and traversing means carried by the supplementary portion of the frame for supporting the outer end of the frame during travel of the tractor.

JAKOB FRÜH.

REFERENCES CITED

The following references are of record in the file of this patent:

UNITED STATES PATENTS

| Number | Name | Date |
|---|---|---|
| 441,938 | Cleek | Dec. 2, 1890 |
| 1,004,041 | Landin | Sept. 26, 1911 |
| 1,800,257 | Kelly | Apr. 14, 1931 |
| 1,912,706 | Goodman | June 6, 1933 |
| 2,168,738 | Meinholdt | Aug. 8, 1939 |
| 2,291,987 | Rogers | Aug. 4, 1942 |
| 2,310,388 | Blair | Feb. 9, 1943 |

FOREIGN PATENTS

| Number | Country | Date |
|---|---|---|
| 16,333 | Great Britain | of 1909 |
| 306,812 | Germany | July 13, 1918 |
| 131,454 | Great Britain | Aug. 22, 1919 |
| 441,597 | Germany | Mar. 5, 1927 |